(12) United States Patent
Kim

(10) Patent No.: US 9,906,071 B2
(45) Date of Patent: Feb. 27, 2018

(54) STANDBY-POWER CUTOFF DEVICE FOR ELECTRONIC PRODUCT USING POWER ADAPTOR

(71) Applicant: MILPROS CO., LTD., Hwaseong, Gyeonggi-do (KR)

(72) Inventor: Chang-Ho Kim, Seoul (KR)

(73) Assignee: MILPROS CO., LTD., Hwaseong, Gyeonggi-do (KR)

( * ) Notice: Subject to any disclaimer, the term of this patent is extended or adjusted under 35 U.S.C. 154(b) by 494 days.

(21) Appl. No.: 14/584,749

(22) Filed: Dec. 29, 2014

(65) Prior Publication Data
US 2015/0115739 A1    Apr. 30, 2015

Related U.S. Application Data

(63) Continuation of application No. PCT/KR2013/005611, filed on Jun. 25, 2013.

(30) Foreign Application Priority Data

Jun. 25, 2012    (KR) .......................... 10-2012-0067737

(51) Int. Cl.
*H01H 19/14*    (2006.01)
*H02J 9/00*    (2006.01)
(Continued)

(52) U.S. Cl.
CPC ............. *H02J 9/005* (2013.01); *H02M 1/36* (2013.01); *H02M 7/12* (2013.01); *H02M 7/217* (2013.01);
(Continued)

(58) Field of Classification Search
CPC ............ H02J 9/005; H02M 1/36; H02M 7/12; H02M 7/217; H02M 2001/0032; Y02B 70/16; Y10T 307/76
(Continued)

(56) References Cited

U.S. PATENT DOCUMENTS

2009/0045680 A1*    2/2009  Litch .................... F25D 17/065
307/66
2010/0320846 A1*    12/2010  Kim ...................... H02J 9/005
307/116

FOREIGN PATENT DOCUMENTS

CN    102315762 A    1/2012
CN    102484392 A    5/2012
(Continued)

OTHER PUBLICATIONS

CN Office Action dated Aug. 12, 2016 in corresponding Chinese Patent Application No. 201380044338.0.

*Primary Examiner* — Rexford Barnie
*Assistant Examiner* — Toan Vu
(74) *Attorney, Agent, or Firm* — Mintz Levin Cohn Ferris Glovsky and Popeo, P.C.; Kongsik Kim; Colleen H. Witherell

(57) ABSTRACT

The present invention is a standby-power cutoff device for an electronic product using a power adaptor. The power adaptor comprises: a power supply unit for receiving external commercial AC power and generating DC power required for the operation of the electronic product; a first switching unit and a first switching driving unit installed in the path for providing the external commercial AC power to the power supply unit so as to cut off or supply the external commercial AC power from/to the power supply unit; a second switching unit and a second switching driving unit having a first contact for cutting off or supplying DC power from/to the electronic product and a second contact additionally connected to a DC power-supply line; a current-sensing unit for sensing the state of the current being provided to the electronic product; and an adaptor control unit for receiving the sensed signal from the current sensing unit in order to detect whether the electronic product is in an off state, if the electronic product is in the off state, control-
(Continued)

ling the first switching unit and the second switching unit such that the first and second switching units cut off power, and controlling the second contact to be in an on state, receiving the state of the signal of the DC power supply line through the second contact in order to detect if the electronic product is turned on, and, if the electronic product is in the on state, controlling the first switching unit and the second switching unit such that the first and second switching units operate to supply power, and controlling the second contact to be in an off state.

3 Claims, 2 Drawing Sheets

(51) Int. Cl.
*H02M 7/12* (2006.01)
*H02M 1/36* (2007.01)
*H02M 7/217* (2006.01)
*H02M 1/00* (2006.01)

(52) U.S. Cl.
CPC ...... *H02M 2001/0032* (2013.01); *Y02B 70/16* (2013.01); *Y10T 307/76* (2015.04)

(58) Field of Classification Search
USPC .......................................................... 307/115
See application file for complete search history.

(56) References Cited

FOREIGN PATENT DOCUMENTS

| | | |
|---|---|---|
| JP | 2012103965 A | 5/2012 |
| KR | 20040047644 A | 6/2004 |
| KR | 20060063731 A | 6/2006 |
| KR | 100934970 B1 | 1/2010 |
| KR | 100965611 B1 | 6/2010 |
| KR | 20100098703 A | 9/2010 |
| KR | 20110077625 A | 7/2011 |
| KR | 101069430 B1 | 9/2011 |

\* cited by examiner

STANDBY-POWER CUTOFF DEVICE FOR ELECTRONIC PRODUCT USING POWER ADAPTOR

CROSS-REFERENCE TO RELATED APPLICATIONS

This application is a continuation of International Application No. PCT/KR2013/005611 filed on Jun. 25, 2013, which claims priority to Korean Application No. 10-2012-0067737 filed on Jun. 25, 2012. The applications are incorporated herein by reference.

TECHNICAL FIELD

The present invention relates to a technology for cutting off a standby power of an electronic product, and more particularly, to a device for cutting off a standby power of an electronic product using a power adaptor.

BACKGROUND ART

Recently, various electronic products such as a digital telephone, a camera, an electronic notebook, a Personal Digital Assistant (PDA), a smart phone, a media player, a notebook computer, a tablet PC, an all-in-one PC, a monitor and a T.V. are being developed and propagated. Many of these electronic products have a construction that receives external commercial AC power using a power adaptor. According to a trend in which a power adaptor is externally separated and is used in order to make an electronic product to be thin, it is expected that the use of the power adaptor will be increased in the future.

For example, a power adaptor that includes a power plug, one that is connected to a wall socket (or a wall outlet) to receive commercial AC power of 220 V, generates DC operation power of a corresponding electronic product that is connected to the power adaptor, and outputs the DC operation power such as 15 V.

For example, the technology related to an electronic product which receives power using such a power adaptor is disclosed in a domestic patent application No. 10-2003-84343 (title: "power supply control method, current-to-voltage conversion circuit and electronic apparatus," applicant: FUJITSU LIMITED, inventor: Shigeo Tanaka et al. one person, application date: 2003 Nov. 26) and a domestic patent application No. 10-2010-7015780 (title: power adaptor", applicant: Sony Ericsson Mobile Communications AB, inventor: Fredrik Bagenholm et al. one person, application date: 2008 Sep. 2).

Meanwhile, recently, standby power cutoff devices of various structures have been employed in an electronic product. In the electronic product using the power adaptor as described above, cutting off the standby power of the power adaptor is not easy. That is, even though the power of the electronic product is turned off or the electronic product is separated from the power adaptor, if a power plug of the power adaptor is not separated from a wall socket (or a wall outlet), the power of the power adaptor is not cut off. In this case, since the standby power of the power adaptor is generated, power is unnecessarily dissipated, and when the power adaptor is struck by lightning, the product is damaged, since power is continuously provided, a lifetime of the product is shortened, and when the product is shorted, there is risk of fire due to an over-current.

SUMMARY

Therefore, the present invention is made for enhancing the above-mentioned problems of the prior art, and the present invention provides a standby power cutoff device which enables supplies of a power 'on' signal and power through two DC power supply lines of a power adaptor of an existing electronic product, when power of the electronic product is turned off, cuts off the power of the power adaptor to cut off standby power even though a power plug of the power adaptor is not separated from a wall socket, in the above-mentioned state, when the power of the electronic product is turned on, the power is automatically provided to the power adaptor to enable the power is provided to the electronic product.

According to an aspect of the present invention, a standby power cutoff device of an electronic product using a power adaptor is provided. The power adaptor comprises: a power supply unit that receives external commercial AC power and generates DC power required for an operation of the electronic product and operation power of internal function units of a corresponding power adaptor; a first switching unit and a first switching driving unit that are installed in a path for providing the external commercial AC power to the power supply unit and cut offs or supplies the external commercial AC power which is provided to the power supply unit by an external control; a second switching unit and a second switching driving unit that are installed in a path for providing the DC power generated from the power supply unit to the electronic product through a predetermined DC power supply line, and include a first contact point which cuts off or supplies the DC power provided to the electronic product by the external control and a second contact point that is additionally connected to the DC power supply line; a current sensing unit that senses a state of a current being provided to the electronic product; and an adaptor control unit that receives a sensing signal from the current sensing unit in order to detect an off state of the electronic product, when the electronic product is in the off state, enters to a sleep mode, controls the first switching unit and the second switching unit such that the first and second switching units cut off power, controls the second contact point to be in an on state, receives a signal state of the DC power supply line through the second contact point in order to detect a turn on operation state of the electronic product, when the electronic product is in the on state, controls the first switching unit and the second switching unit such that the first and second switching units supply power, and controls the second contact point to be in an off state.

According to another aspect of the present invention, a standby power cutoff device of an electronic product using a power adaptor is provided. The standby power cutoff device comprises: the power adaptor that receives external commercial AC power, generates DC power required for an operation of the electronic product to provide the DC power to the electronic product through a predetermined DC power supply line, senses a state of a current being provided to the electronic product and detect an off state of the electronic product to cut off the DC power provided to the electronic product and operate as a sleep mode, and in the sleep mode, detects a power state of the DC power line and detects a turn on operation state of the electronic product to provide the DC power to the electronic product; and the electronic product that includes a power switch which connects the DC power of the DC power supply line, which is provided from the power adaptor with a ground end, by a user's operation, and generate on/off operation signals.

As described above, the present invention adds a construction which cuts off standby power when power of an electronic product is turned off to a corresponding electronic product and a power adaptor, therefore, even though a power plug is inserted into a wall socket, since standby power of the power adaptor is automatically cut off, dissipated power can be reduced, and since power is separated from the power adaptor, danger of lightning or fire can be prevented and a lifetime of a product can be lengthened.

In addition, since dissipated power is reduced, CO2, which is generated during a power generation, can be reduced and thus environment pollution can be prevented.

DETAILED DESCRIPTION

Figure 1:
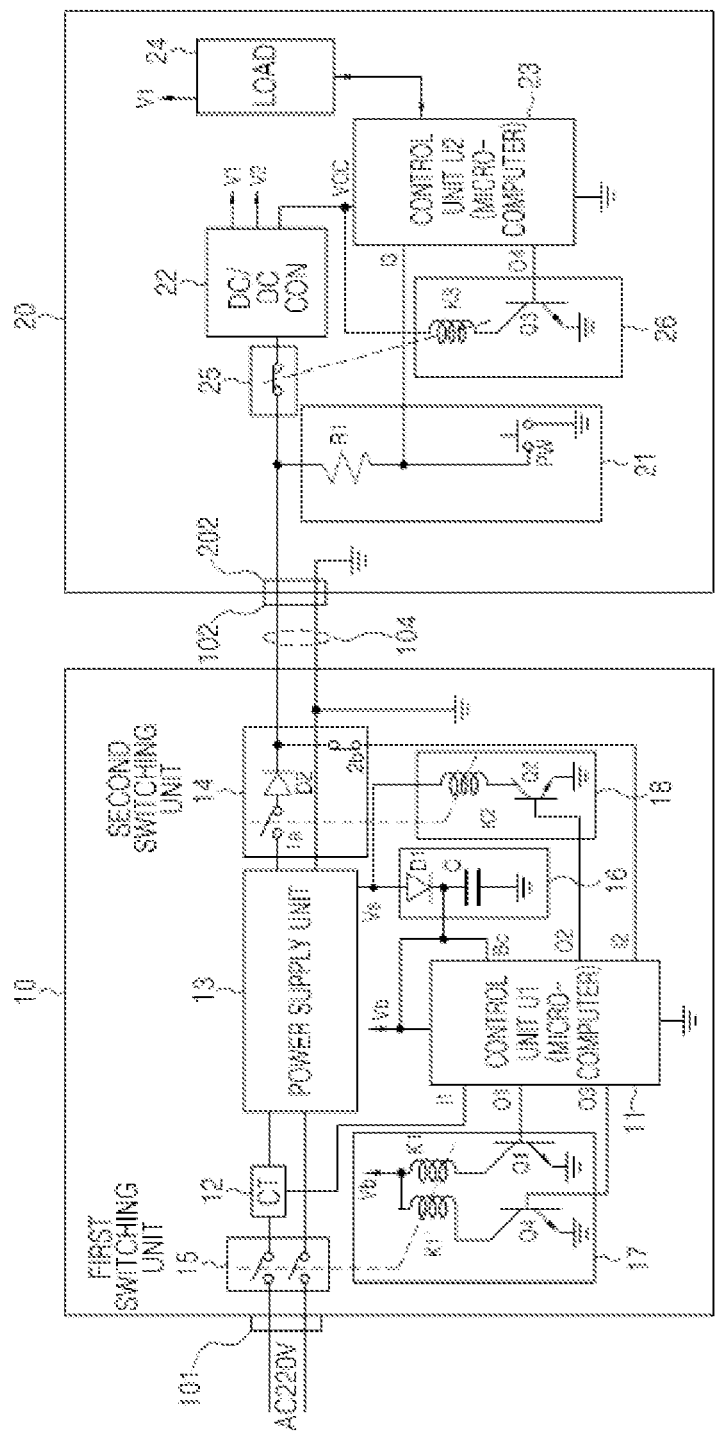
FIG. 1 is a block construction diagram of a standby power cutoff device of an electronic product using a power adaptor according to an exemplary embodiment of the present invention.

Hereinafter, a preferable exemplary embodiment is described in detail with reference to accompanying drawings. In the description below, specific elements such as a power supply unit, a first switching unit, a second switching unit, an adaptor control unit, an electronic product control unit, a DC/DC converter, a load, a current sensing unit, a switcher, a first switching driving unit, a second switching driving unit, a switcher driving unit and a sleep mode power unit are disclosed, but these are just provided to help with the overall understanding of the present invention. It is obvious that the specific elements may be changed or modified within a range of the present invention to a person having an ordinary skill in the art. In addition, in the drawings below, the same reference numeral is marked to the same elements as much as possible.

Hereinafter, a construction and an operation of the present invention will be described in detail with reference to the accompanying drawings.

Figure 2:
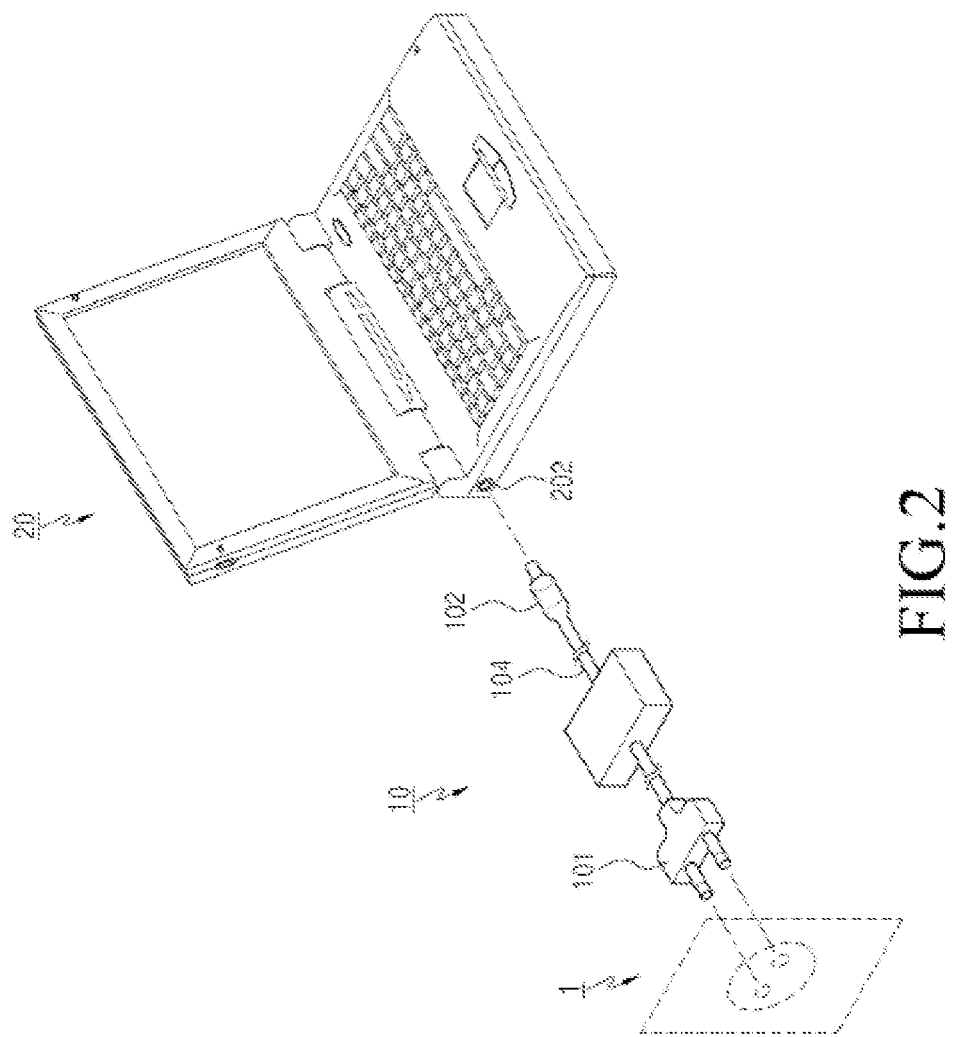
FIG. 2 is an external structure diagram of FIG. 1.

FIG. 1 is a block construction diagram of a standby power cutoff device of an electronic product using a power adaptor according to an exemplary embodiment of the present invention. FIG. 2 is an external structure diagram of FIG. 1. Referring to FIGS. 1 and 2, a power adaptor 10 according to an exemplary embodiment of the present invention, has a construction which includes, for example, a power plug 101 to be connected with a commercial wall socket (i.e., a wall outlet), receives commercial AC power 220 V, generates DC operation power, such as 15 V, of a corresponding electronic product 20 connected to the power adaptor, and outputs the DC operation power. For a connection between the power adaptor 10 and the electronic product 20, an electrical cord or a cable 104 having a connector 102 is included in an end of the power adaptor 10, and a docking station, a jack or a receptacle structure of a proper form may be included in the connector 102. The form of the connector 102 may be designed in various structures and forms, and thus the connector 102 may be connected to a corresponding electronic product 202 so that the connector 102 is attachable and detachable to and from the electronic product 202.

In the above-mentioned construction, a construction in which when the electronic product 202 is turned off or the connector 102 is detached from the electronic product 202, the power adaptor 10 senses this state to cut off standby power, in addition, in such a state, when the electronic product is turned on, the power adaptor 10 senses this to supply power to the electronic product 20 is requested. For such a construction, simply forming a separate signal line between the power adaptor 10 and the electronic product may be considered, however, in general, a standardized cable having two lines of a ground line and a +line for supplying a DC power supply and a connector according to the cable are included between the power adaptor 10 and the electronic product 20, and arranging a separate signal line is not preferable. Therefore, in the present invention, power is transferred from the power adaptor 10 to the electronic product 20 and a power on/off operation signal of the electronic product 20 is transferred to the power adaptor 10 through two lines of DC power supply lines between the power adaptor 10 and the electronic product 20.

The power adaptor 10 includes: a power supply unit 13 that receives external commercial AC power and generates DC power required for an operation of the electronic product 20 and operation power of internal function units of a corresponding power adaptor 10; a first switching unit 15 and a first switching driving unit 17 that are installed in a path for providing the external commercial AC power to the power supply unit 13, at a frond end of the power supply unit 13, and cut offs or supplies the external commercial AC power, which is provided to the power supply unit 13 by an external control; a second switching unit 14 and a second switching driving unit 18 that are installed in a path for providing the DC power generated from the power supply unit 13 to the electronic product 20 through a predetermined DC power supply line 104, and include a first contact point 1a which cuts off or supplies the DC power provided to the electronic product 20 by the external control and a second contact point 2b which is additionally connected to the DC power supply line 104; a current sensing unit 12 that senses a state of a current being provided to the electronic product 20; and an adaptor control unit 11 that receives a sensing signal from the current sensing unit 12 in order to detect an off state of the electronic product 20, when the electronic product 20 is in the off state, enters to a sleep mode, controls the first switching unit 15 and the second switching unit 14 such that the first and second switching units 14 and 15 cut off power, controls the second contact point 2b to be in an on state, receives a signal state of the DC power supply line 104 through the second contact point 2b in order to detect a turn on state of the electronic product 20, when the electronic product 20 is in the on state, controls the first switching unit 15 and the second switching unit 14 such that the first and second switching units 14 and 15 supply power, and controls the second contact point 2b to be in an off state.

The electronic product 20 includes: a power switch 21 that connects the DC power of the DC power supply line 104, which is provided from the power adaptor 10, with a ground end, by a user's operation, and generates on/off operation signals; a power converting unit 22 that receives the DC power provided from the power adaptor 10 and generates and provides power required for internal each function units of a corresponding electronic product 20; a switcher 25 and a switcher driving unit 26 that are installed in a path for providing the DC power to the power converting unit 22, at a front end of the power converting unit 22, and cut off or supply the DC power provided to the power converting unit 22 by the external control; an electronic product control unit that controls the switcher 25 and the switcher driving unit 26 such that the switcher and the switcher driving unit 25 and 26 cut off power in a case of the off state, and controls the switcher and the switcher driving unit 25 and 26 such that the switcher and the switcher driving unit 25 and 26 supply power in a case of the on state, according to the on/off operation signals of the power switch 21.

The construction of the present invention is described in more detail.

As shown in FIG. 1, the construction of the electronic product 20 includes a power switch PW 21 (e.g., a tact switch or a touch switch (of a capacitance method) so as to transfer a power 'on' signal is to the power adaptor 10 when power is cut off and transfer a power 'off' signal to the electronic product control unit U2 23 when the power is provided to the electronic product 20 and the electronic product is operated, as a means for transferring the power 'on' signal and the power 'off' signal.

In addition, the switcher is constructed such that a relay K3 contact point is to be a connected state in order to provide DC power to a path through which the DC power provided from the power adaptor 10 to a DC/DC converter 22 when the electronic product 20 is turned on and cuts of the DC power provided to the DC/DC converter 22 when the electronic product 20 is turned off.

The switcher driving unit 26 is constructed with a transistor Q3 and a coil of the relay K3 such that a contact point of the switcher 25 is driven and cuts off the DC power under a control of a microcomputer of the electronic product control unit U2 23 when the power is 'off' state.

In addition, the electronic product 20 includes the power converting unit 22 (i.e., the DC/DC converter) that generates and provides power necessary for internal each function units of a corresponding electronic product when the DC power is supplied to the electronic product 20, the electronic product control unit U2 23 (e.g., a microcomputer) that controls a function of the electronic product, and a load 24 that receives an instruction of the electronic product control unit 23 and performs a function of the corresponding electronic product.

Meanwhile, the power adaptor 10 includes the first switching unit 15 and the first switching driving unit 17. The first switching unit 15 performs a switching operation with a contact point between the latching relays K1 and K1' in the path for cutting off or supplying the commercial AC input power. The switching driving unit 17 includes transistors Q1 and Q4 and coils (i.e., the latching relays K1 and K1') in order to drive the first switching unit 15 under a control of an adaptor U1 11.

In addition, the power adaptor 10 includes the power supply unit 13 that generates and supplies the DC power necessary for the electronic product 20 when the external commercial AC power is provided through the first switching unit 15.

In addition, the power adaptor 10 includes the second switching unit 14 having a relay K2, the contact points 2a and 2b and a diode D2, such that the power 'on' signal of the electronic product 20 in the case of the power off state of the electronic product 20 and the DC power in the case of the power supply are not conflicted and separated. Thus, the DC power supply and the transmission of the power 'on' signal to the electronic product 20 are possible through existing two DC power supply lines.

Meanwhile, in order to drive the second switching unit 14 by the control of the adaptor control unit U1 11, the second switching driving unit 18 is constructed with the transistor Q2 and the relay K2. The power adaptor 10 includes the power adaptor control unit U1 11 that receives, operates, analyzes and determines a state of the power adaptor 10 to control the power adaptor 10.

In addition, the power adaptor 10 includes a current sensing unit CT 12 as a means for sensing the off state when the electronic product 20 is turned off. The current sensing unit CT 12 senses a current of the AC power provided from the power adaptor 10 to the front end of the power supply unit 13, and provides the current to the adaptor control unit U1 11.

In addition, when the power of the electronic product 20 is turned off, the first switching unit 15 is closed and the power is not supplied, in order to detect the power 'on' signal of the electronic product 20, minimum power should be provided to the adaptor control unit U1 11. In order to provide this power, the power adaptor 10 includes a sleep mode power unit 16, and the sleep mode power unit 16 includes a diode D1 and a super capacitor C.

An operation principle and a control method of the present invention are described in detail.

First, in a power supply operation principle and a control method of the power adaptor 10, when the power adaptor 10 is manufactured, the contact point K1 is to be a connection state, when a power plug is inserted into a socket, power is provided, and thus the power supply unit 13 generates and supplies the DC power required in the electronic product 20.

In addition, when power Vs generated in the power supply unit 13 is supplied to the sleep mode power unit 16, the power Vs is charged in the super capacitor C through the diode D1. Power Vb of the adaptor control unit U1 11 is applied. The microcomputer of the adaptor control unit U1 11 is normally operated, reads an input I2, and checks whether the power 'on' signal of the electronic product 20 is there.

When the power 'on' signal is there, the adaptor control unit U1 11 reads a current flowing through the current sensing unit CT 12, and stores the current as an off current value (hereinafter, referred to as CTi) in the case of the power 'off'.

In addition, the microcomputer of the adaptor control unit U1 11 reads a voltage Vb of the sleep mode power unit 16 through the input Bc, when the voltage Vb reaches to a charge voltage (hereinafter, referred to as VF), in order to cut off an input voltage, a 'high' pulse is output through an output O3, the transistor Q4 of the first switching unit 17 is turned on, the coil K1' is energized, the latching relay K1 contact point of the first switching unit 15 is opened, the power supply is cut off, and thus the standby power is cut off.

At this time, the microcomputer enters a sleep mode in order to minimize power consumption.

The diode D1 of the sleep mode power unit 18 prevents a discharge due to a countercurrent.

In the present invention, since the microcomputer of a low power is used, current consumption in the case of the sleep mode is 1 μA. Therefore, when a super capacitor of 1 F is used, a function can be performed for about five days without recharging. In order to prevent a lowering of the power of the sleep mode power unit 16 under a minimum operable voltage (hereinafter, referred to as VU) because of a nonuse of the electronic product 20 for five days and a discharging of the sleep mode power unit 16, operations in which a 'high' pulse is output through an output O1, the transistor Q1 of the first switching driving unit 17 is turned on, the coil K1 is energized, the latching relay K1 contact point of the first switching unit 15 is connected, the power is supplied to charge the sleep mode power unit 16, when the sleep mode power unit 16 is charged completely as described above, the power is cut off, and the microcomputer enters the sleep mode, are repeated. About four minutes are enough for a charge time, and current consumption is about 4 W.

For example, when the electronic product is not used and the electronic product is left for one year, the power consumption per year is about 0.4 Wh per year in the present invention, and thus the power consumption may be regarded as 0 W.

In addition, the contact point 2b is in the connected state such that the power 'on' signal of the electronic product 20 is input to the input I2 of the microcomputer of the adaptor control unit U1 11 when the power of the electronic product 20 is the 'off' state, the contact point 1a is in the open state to cut off the power supply in order to cut off an output power of the power supply unit 13 provided to the electronic product 20, and thus the power 'on' signal and the power supply commonly use two lines without a conflict between the power 'on' signal and the power supply.

A power 'on' operation and a control method are described.

In the above-mentioned power 'off' state, the power switch PW 21 is turned on, a corresponding switch is connected to a ground, a 'low' signal is transferred to the input I2 of the microcomputer of the adaptor control unit U1 11 through a resistor R1 and the contact point 2b of the second switching unit 14, the microcomputer senses this signal, the microcomputer is out of the sleep mode, in order to supply the power to the power adaptor 10, a 'high' pulse is output to the output 01, the transistor Q1 of the first switching driving unit 17 is turned on, the coil K1 of the latching relay K1 is energized, the contact point of the first switching unit 15 is connected, and thus the power is supplied to the power supply unit 13.

In addition, in order to supply the DC power generated from the power supply unit 13 by the supply of the power to the electronic product 20, the microcomputer of the adaptor control unit U1 11 outputs a 'high' through an output 02, the transistor Q2 of the second switching driving unit 18 is turned on, the coil of the relay K2 is energized, the contact point 1a of the second switching unit 14 is connected, the DC power is supplied to the electronic product 20 through the diode D2, the contact point 2b is opened, the power 'on' signal is separated from the power line, and thus the power and the signal are not conflicted.

When the DC power is provided to the electronic product 20, since the relay contact point of the switcher 25 is connected, the DC power is provided to the DC/DC converter 22, which generates the power necessary for the product and provides the power through the contact point.

When the power necessary for the product is generated and provided from the DC/DC converter 22, the microcomputer of the electronic product control unit U2 23 is normally operated, controls the product, controls the load 24, and thus the product is normally operated.

A power 'off' operation and a control method are described.

In the above-mentioned state, when the power switch PW 21 is pushed in order to turn off the power switch PW 21, an input of the microcomputer of the electronic product control unit U2 23 is 'low.' The microcomputer senses this signal as the power 'off.' outputs a 'high' through an output 04, turns on the transistor Q3 of the switcher driving unit 26. The relay coil K3 is energized, the contact point of the switcher 25 is opened, and thus the DC power supply to the DC/DC converter 22 is cut off.

When the power supply is cut off, since the current value of the current sensing unit CT 12 of the power adaptor 10 is the off current value CTi, when this value is input into the input terminal of the microcomputer of the adaptor control unit U1 11, it is determined that the electronic product 20 is turned off, the microcomputer outputs a 'high' pulse through the output 03, the transistor Q4 of the first switcher driving unit 17 is turned on, the latching relay coil K1' is energized, the contact point of the first switching unit 15 is opened, and thus the power is cut off.

In addition, a 'low' is output through the output 02, the transistor Q2 of the second switching driving unit 18 is turned off, the relay coil K2 is de-energized, the contact point 1a of the relay K2 is opened and the contact point 2b is connected.

Therefore, it is maintained in an initial state to receive the power 'on' signal. In addition, the microcomputer enters the sleep mode, consumes power minimally, periodically checks such that the voltage Vb is not lower than the VU, and repeats the above-mentioned charging operation to control.

If it is not used for a long time and the power plug of the power adaptor 10 is separated, since it is discharged in a state in which the contact point of the latching relay K1 is connected before the voltage Vb is equal to or less than the VU, when the power plug is inserted again, it is operated like the first time.

As described above, according to an exemplary embodiment of the present invention, a construction and an operation of cutting off standby power of a power adaptor of an electronic product can be performed. Meanwhile, in the above description of the present invention, a specific exemplary embodiment of the power adaptor cutting off the standby power is described, but, various changes may be implemented without departing from a scope of the present invention. Therefore, the scope of the present invention should not be determined by the described exemplary embodiment and determined by claims and equivalents thereof.

The invention claimed is:

1. A standby power cutoff device of an electronic product using a power adaptor, the power adaptor comprising:
   a power supply unit that receives external commercial AC power and generates DC power required for an operation of the electronic product and operation power of internal function units of a corresponding power adaptor;
   a first switching unit and a first switching driving unit that are installed in a path for providing the external commercial AC power to the power supply unit, at a front end of the power supply unit, and cut offs or supplies the external commercial AC power which is provided to the power supply unit by an external control;
   a second switching unit and a second switching driving unit that are installed in a path for providing the DC power generated from the power supply unit to the electronic product through a predetermined DC power supply line, and include a first contact point which cuts off or supplies the DC power provided to the electronic product by the external control and a second contact point which is additionally connected to the DC power supply line;
   a current sensing unit that senses a state of a current being provided to the electronic product; and
   an adaptor control unit that receives a sensing signal from the current sensing unit in order to detect an off state of the electronic product, when the electronic product is in the off state, enters to a sleep mode, controls the first switching unit and the second switching unit such that the first and second switching units cut off power, controls the second contact point to be in an on state, receives a signal state of the DC power supply line through the second contact point in order to detect a turn on operation state of the electronic product, when the electronic product is in the on state, controls the first switching unit and the second switching unit such that the first and second switching units supply power, and controls the second contact point to be in an off state.

2. The standby power cutoff device as claimed in claim 1, wherein the electronic product comprises:
- a power switch that connects the DC power of the DC power supply line, which is provided from the power adaptor, with a ground end, by a user's operation, and generates on/off operation signals;
- a power converting unit that receives the DC power provided from the power adaptor and generates and provides power required for internal each function units of a corresponding electronic product;
- a switcher and a switcher driving unit that are installed in a path for providing the DC power to the power converting unit, at a front end of the power converting unit, and cut off or supply the DC power provided to the power converting unit by the external control;
- an electronic product control unit that controls the switcher and the switcher driving unit such that the switcher and the switcher driving unit cut off power in a case of the off state, and controls the switcher and the switcher driving unit such that the switcher and the switcher driving unit supply power in a case of the on state, according to the on/off operation signals of the power switch.

3. The standby power cutoff device as claimed in claim 1, wherein the power adaptor comprises a sleep mode power unit that generates the operation power in the sleep mode.

* * * * *